United States Patent [19]

Brisco

[11] Patent Number: 4,524,998
[45] Date of Patent: Jun. 25, 1985

[54] TUBULAR CONNECTING DEVICE

[75] Inventor: David P. Brisco, Duncan, Okla.

[73] Assignee: Halliburton Company, Duncan, Okla.

[21] Appl. No.: 374,869

[22] Filed: May 4, 1982

[51] Int. Cl.³ .............................................. F16L 17/00
[52] U.S. Cl. ................................. 285/101; 285/354; 285/388; 285/365; 166/70
[58] Field of Search ............... 285/354, 388, 24, 387, 285/419, 116, 101, 365

[56] References Cited

U.S. PATENT DOCUMENTS

| | | | |
|---|---|---|---|
| 1,016,620 | 2/1912 | Gapp | 285/388 |
| 1,098,620 | 6/1914 | Gillar | 285/419 X |
| 1,662,311 | 3/1928 | Hamer . | |
| 1,866,726 | 7/1932 | Santiago . | |
| 2,223,388 | 12/1940 | Scaramucci . | |
| 2,498,915 | 2/1950 | Espegren | 285/375 X |
| 2,620,037 | 7/1951 | McClendon . | |
| 3,113,792 | 12/1963 | Brown | 285/354 |
| 3,291,442 | 12/1966 | Cranage | 285/101 X |
| 3,545,542 | 12/1970 | Scott . | |
| 3,616,850 | 11/1971 | Scott . | |
| 3,863,716 | 1/1975 | Streich . | |
| 4,209,193 | 6/1980 | Ahlstone . | |
| 4,209,270 | 6/1980 | Billingsley . | |
| 4,219,226 | 8/1980 | Kappenhagen | 285/354 |
| 4,246,967 | 1/1981 | Harris . | |
| 4,290,482 | 9/1981 | Brisco . | |

OTHER PUBLICATIONS

U.S. patent application Ser. No. 296,325 of Stromberg, filed Aug. 26, 1981, entitled Quick Connect Coupler.
Brouchure of Razorback Oil Tools of Carthage, Texas, attached hereto as Exhibit "A", 4 pages.

Primary Examiner—Thomas F. Callaghan
Attorney, Agent, or Firm—James R. Duzan

[57] ABSTRACT

A coupling apparatus is provided for quick coupling of a plug container to a casing collar. A latch collar including pivotally connected arcuate collar portions is provided for engaging a lower end of the casing collar. A threaded adjustment is provided for increasing an initial compression of a seal against the upper end of the casing collar. Hydraulic biasing increases the seal against the upper end of the casing collar. An improved construction of inlet nozzles for the plug container is also disclosed.

3 Claims, 11 Drawing Figures

TUBULAR CONNECTING DEVICE

This invention relates generally to couplings constructed to be quickly connected to a cylindrical member, and more particularly, but not by way of limitation, to a coupling for quickly connecting a plug container to a casing of an oil or gas well. Improvements in seals for plug containers and in the plug containers themselves are also disclosed.

One operation which is often conducted during the completion of an oil or gas well is a cementing operation wherein fluid cement is pumped down the central bore of a well casing and out through ports in the side of the well casing into an annulus between the well casing and the oil well borehole where the cement is allowed to harden to provide a seal between the well casing and the well borehole.

At the beginning of a typical cementing job, in rotary drilled wells, the well casing and the well borehole are usually filled with drilling mud. To reduce contamination at the interface between the drilling mud and the cement which is pumped into the well casing on top of the drilling mud, a bottom cementing plug is pumped ahead of the cement slurry so that the interface between the cement slurry and the drilling mud already in the well casing is defined by the bottom cementing plug.

As the cement is pumped into the well casing, the bottom cementing plug is pumped down the well casing and this plug also serves the function of wiping mud from the walls of the casing ahead of the cement slurry thereby reducing dilution of the cement slurry. When this bottom cementing plug reaches a float collar located in a portion of the well casing, the bottom cementing plug catches in the float collar and the differential pressure due to the high pressure cement located above the bottom cementing plug ruptures a diaphragm of the bottom cementing plug thereby allowing the cement slurry to proceed down through the plug and then through the appropriate ports into the annulus between the well casing and the borehole.

At the completion of the mixing of the cement slurry, a top cementing plug is pumped into the well casing similarly defining an interface between the upper level of the cement slurry within the well casing and drilling mud which is pumped in on top of the cement slurry.

This top cementing plug is solid and when it lands in the float collar, the displacement of cement is terminated.

Sometimes it is desirable to be able to place the cementing plugs in the well casing without opening the well casing. In such a situation, a plug container is mounted on top of the well casing. This plug container holds the cementing plugs and includes a mechanical retaining means which keeps the plugs from falling into the well casing until the desired time.

A great many of the prior art plug containers are connected to the well casing by merely utilizing a threaded male lower end which is threaded into a casing collar. Several problems have been encountered using this type of prior art threaded connection between the plug container and the casing collar. Often, the top of the casing stands as much as fifteen feet above the floor of the drilling rig thus creating a hazard to personnel who attempt to work at that height to perform the threading operation. This is apparent when one considers that the plug container is a relatively heavy piece of equipment which is typically handled with chain tongs. In addition, the prior art device of this type is susceptible to cross-threading when threaded to the casing collar. Such cross-threading sometimes may cause blowouts under high pressure conditions.

It has also been proposed in the prior art to provide plug containers having means for quickly connecting the plug container to a casing collar in some manner other than making a threaded connection to the casing collar.

One example of such a quick connecting prior art plug container is that shown in U.S. patent application Ser. No. 296,325 of Stromberg, filed Aug. 26, 1981, and assigned to the assignee of the present invention.

The present invention provides an improved quick connecting plug container which is simpler in its construction than that of Stromberg. The quick connect coupling provides an advantage in that it may be adjusted for any length of casing collar, and there is no need to measure the lengths of the casing collars involved.

The coupling apparatus of the present invention includes a body having a cylindrical bore disposed in a lower end thereof. The upper end of the casing collar is closely received within the bore of the body. A main seal means is disposed in the bore of the body and includes an outer seal sealing against the bore of the body and a lower main seal for sealing against the upper end of the casing collar. This main seal is hydraulically biased against the casing collar.

A cylindrical adjusting nut has an internally threaded upper end threadedly engaged with a threaded outer surface of the body. A locking collar including first and second pivotally connected arcuate collar portions is connected to the adjusting nut. The locking collar may be opened so as to be placed over a casing collar, and then the locking collar may be closed by pivotally swinging the arcuate collar portions together so that a lower lip of each of the collar portions engages a lower end of the casing collar.

Then, by making up the threaded connection between the adjusting nut and the body, the body is pulled downward toward the casing thus compressing the main seal means. A limit means is provided for limiting the opening movement of the arcuate collar portions, and a latch means is provided for latching the collar in either its open or closed position.

Numerous objects, features and advantages of the present invention will be readily apparent to those skilled in the art upon a reading of the following disclosure when taken in conjunction with the accompanying drawings.

FIG. 5 is a plan view of the limit ring of the locking collar.

FIG. 6 is a plan sectional view along line 6—6 of FIG. 1 illustrating the manner in which the upper lips of the locking collar engage the lower surface of the groove of the adjusting nut when the locking collar is in its open position.

Referring now to the drawings, and particularly to FIG. 1, the plug container of the present invention is shown and generally designated by the numeral 10.

The plug container 10 includes a housing 12 which has a cap 14 threadedly connected to an upper end thereof. An O-ring seal 164 is provided between housing 12 and cap 14. Lugs such as 16 are integrally constructed on the cap 14 so that the plug container 10 may be lifted by attaching a chain 18 or the like to the lugs 16.

Disposed through a wall of the housing 12 is a plunger coupling 20 and first and second lower inlet nozzles 22 and 24. A release plunger (not shown) is disposed through the plunger coupling 20 for holding a cementing plug (not shown) in a prerelease position above the plunger. A release plunger and a plug are shown in the similar plug container illustrated in FIG. 7A.

At its lower end the housing 12 includes an internal thread 26 which threadedly engages an upper external thread 28 of a body 30.

The body 30 has a cylindrical bore 32 disposed in a lower end thereof and has a radially outer threaded lower surface 34.

Figure 1A:
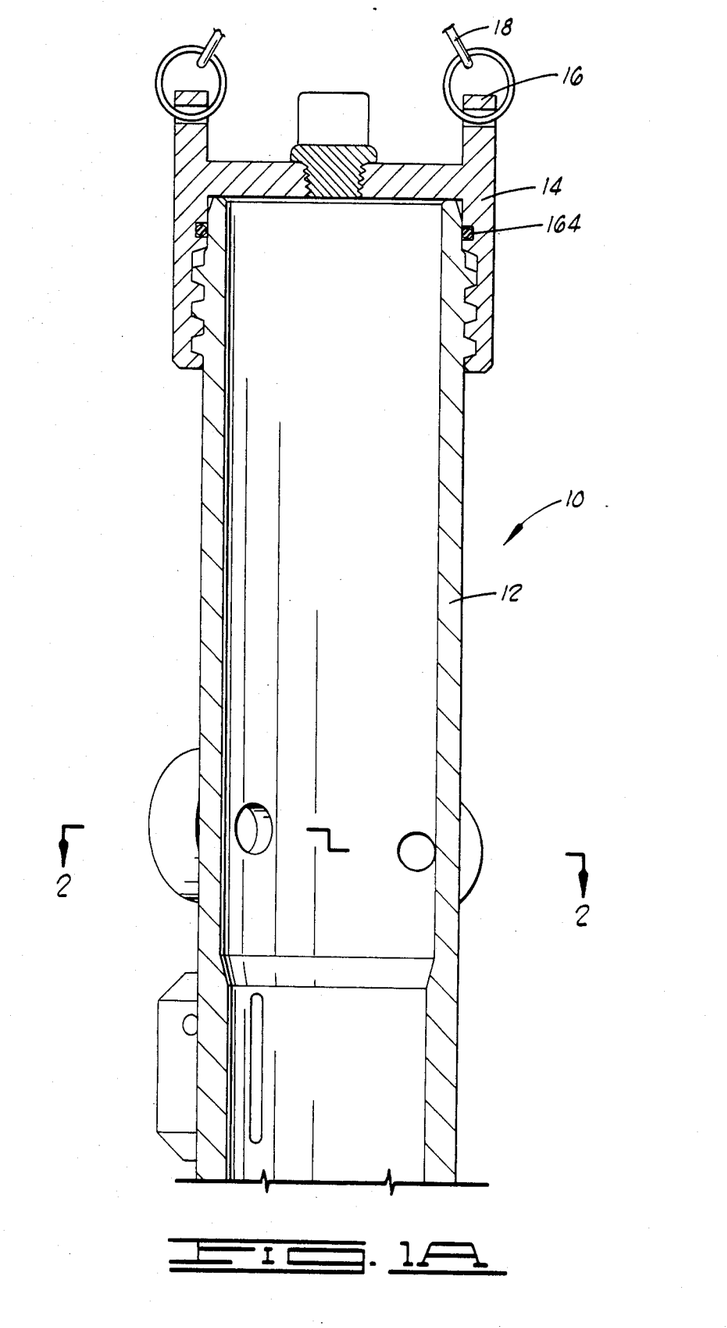
FIGS. 1A–1B comprise a sectioned elevation view of the plug container of the present invention in place upon a casing of an oil well.
Figure 1B:
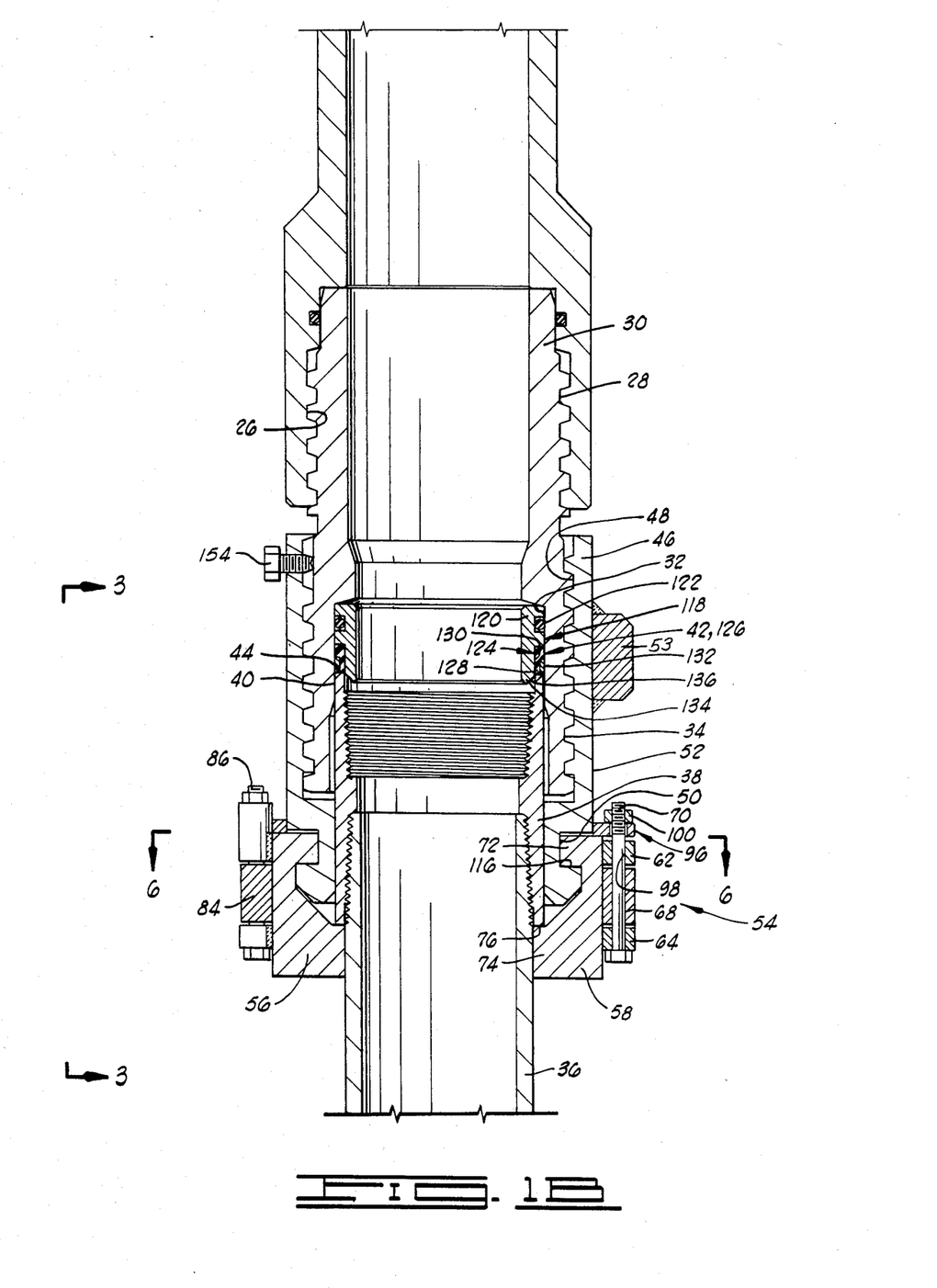
Figure 2:
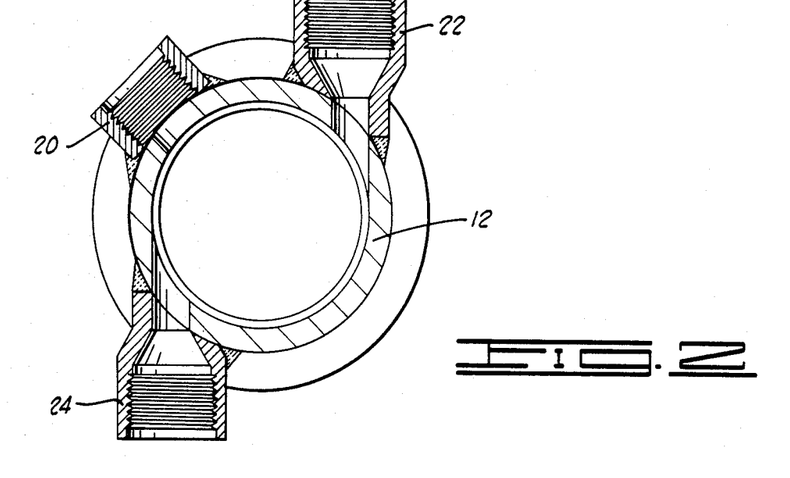
FIG. 2 is a plan section view along line 2—2 of FIG. 1 showing the orientation of the lower inlet nozzles of the plug container.

As shown in FIG. 1B, a casing 36 of a well has a casing collar 38 connected to an upper end thereof. The casing collar 38 has a radially outer surface 40 closely received in the bore 32 of the body 30.

A main seal means 42 is disposed in the bore 32 of body 30 for sealing against an annular upward facing end surface 44 of casing collar 38.

A cylindrical adjusting nut 46 has an internally threaded upper end 48 engaged with the lower outer threaded surface 34 of body 30. Adjusting nut 46 further includes an annular groove 50 disposed in a radially outer surface 52 thereof. A locking screw 154 is disposed through a wall of nut 46, and is tightened against body 30 after nut 46 is made up on body 30. Hammer lugs, such as 53, are welded to adjusting nut 46.

A locking collar 54 is connected to the adjusting nut 46 for longitudinal movement therewith relative to the body 30.

Figure 4:
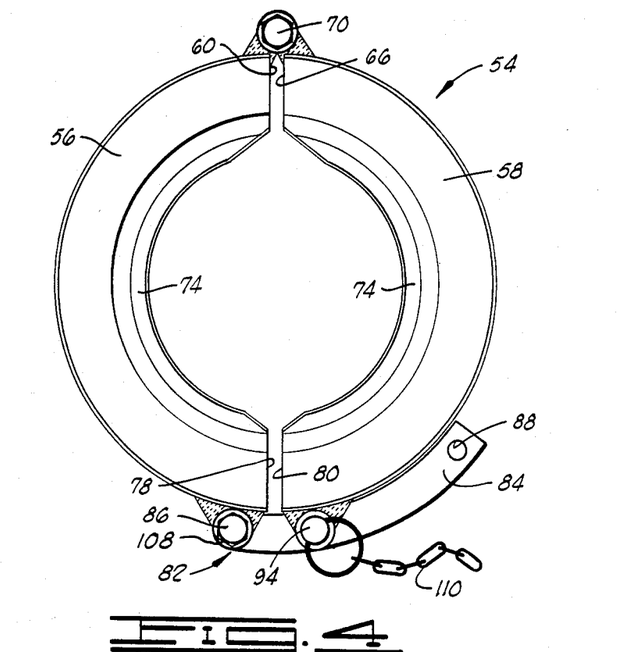
FIG. 4 is a plan view of the locking collar pinned in its closed position.
Figure 4A:
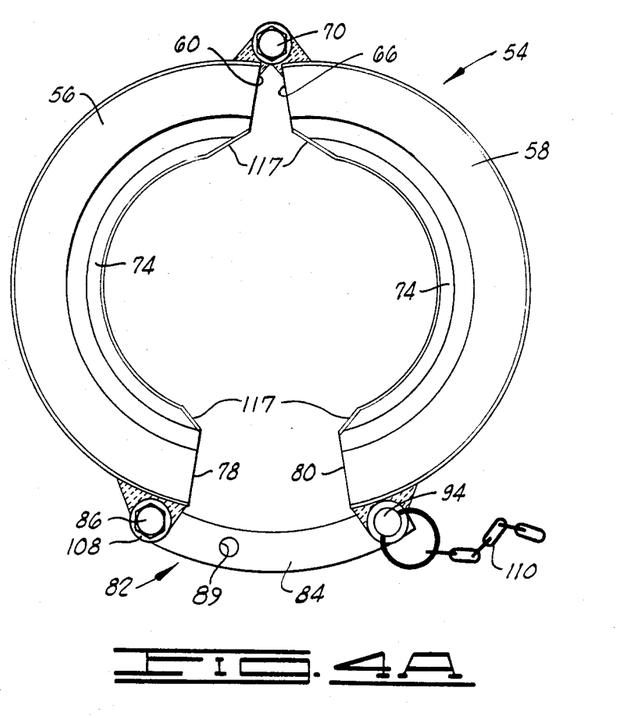
FIG. 4A is a plan view of the locking collar pinned in its open position.

The details of construction of locking collar 54 are best seen in FIGS. 4 and 4A which are closed and open views, respectively, of the locking collar 54.

The locking collar 54 includes first and second arcuate collar portions 56 and 58.

First arcuate collar portion 56 includes a first end 60 to which are welded upper and lower pivot pin receiving sleeves 62 and 64 (see FIG. 1B).

Second arcuate collar portion 58 includes a first end 66 to which is welded a middle pivot pin receiving sleeve 68.

A pivot pin 70 is disposed through the pivot pin receiving sleeves 62, 64 and 68 to pivotally connect the first and second arcuate collar portions 56 and 58.

Each of the first and second arcuate collar portions includes an upper radially inward extending lip 72 and a lower radially inward extending lip 74.

The upper radially inward extending lips 72 are received in the annular groove 50 of adjusting nut 46. The lower annular radially inward extending lips 74 engage a lower end 76 of casing collar 38.

In order to accurately define the orientations of the various components of the present invention relative to the casing 36 and casing collar 38, it is appropriate to define certain orientation terminology.

The casing 36 and casing collar 38 may generally be referred to as a cylindrical member. The casing collar 38 may be referred to as an enlarged diameter portion of the cylindrical member. The upper end 44 of casing collar 38 may be referred to as either an upward facing end or a longitudinally outward facing end of the enlarged diameter portion of the cylindrical member. The lower end 76 of casing collar 38 may be referred to as either a downward facing annular surface or a longitudinally inward facing annular surface of an enlarged diameter portion of the cylindrical member. The term longitudinal refers to directions substantially parallel to a central axis of casing 36 or of cylindrical housing 12.

The coupling apparatus of the present invention may be used on any cylindrical member with an enlarged diameter portion, and is not limited to use with a casing and casing collar. For example, it may be used with a pipe having an enlarged outside diameter end with a tapered shoulder below the enlarged diameter. Thus the term "longitudinally inward facing annular surface" could refer to a tapered annular surface as well as a flat annular surface.

The first and second arcuate collar portions 56 and 58 have second ends 78 and 80, respectively, which may be brought together as shown in FIG. 4 wherein the collar 54 is said to be in a closed position, or which may be spread apart as shown in FIG. 4A wherein the collar 54 is said to be in the open position.

A latch means generally indicated at 82 is provided for selectively latching the first and second collar portions 56 and 58 in either the open or closed position of the collar 54.

The latch means 82 includes an arcuate latch arm 84 which is pivotally connected adjacent the second end of first arcuate member 56 by a vertically oriented pivot bolt 86.

As can best be seen in FIGS. 4 and 4A, the arcuate latch arm 84 is disposed substantially concentrically to the collar 54 and extends across the space between the second ends 78 and 80 of the first and second arcuate collar portions 56 and 58.

Disposed vertically through the latch arm 84 is an open latch position hole 88 and a closed latch position hole 89.

Figure 3:
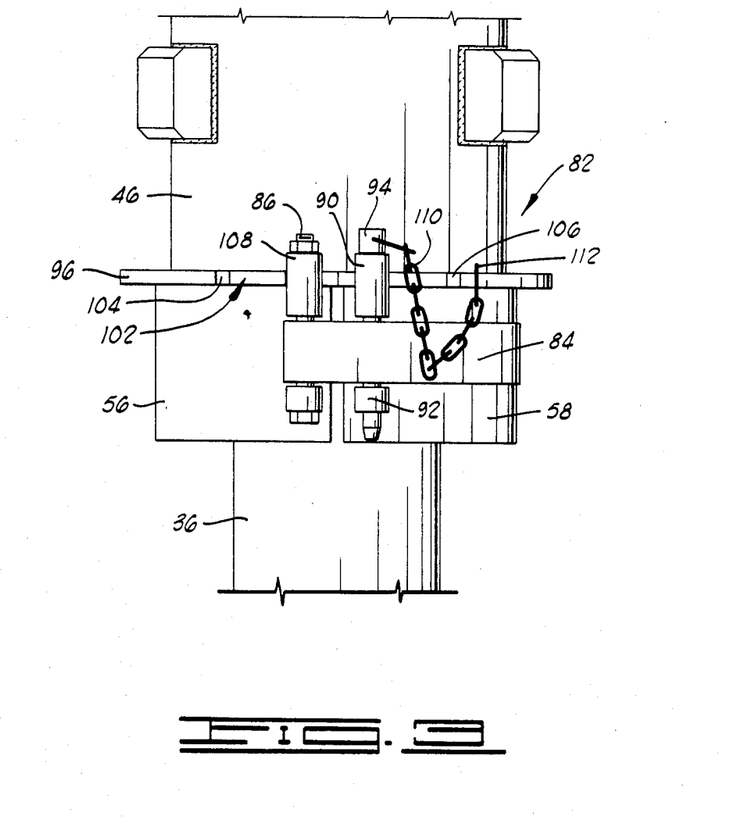
FIG. 3 is a side elevation view of the latch assembly of the collar taken along line 3—3 of FIG. 1.

When the collar 54 is in the closed position as shown in FIGS. 3 and 4, the closed positioning hole 89 is located between positioning pin sleeves 90 and 92 which are welded to the second arcuate collar portion 58 substantially adjacent its second end 80 thereof. A quick release positioning pin 94 is disposed through the sleeves 90 and 92 and through the closed positioning hole 89 of the latch arm 84.

To move the collar 54 to its open position, it is necessary to remove the pin 94 from the latch arm 84 and then pivot the first and second arcuate collar portions 56 and 58 away from each other until the open positioning hole 88 of latch arm 84 is aligned with the sleeves 90 and 92, at which point the positioning pin 94 is inserted through the sleeves 90 and 92 and the open positioning hole 88 to releasably hold the collar in its open position.

A limit plate 96, which can best be seen in FIGS. 1B and 5, is an annular flat plate concentrically disposed about the adjusting nut 46. Limit plate 96 has an orienting hole 98 disposed therethrough through which is received the pivot pin 70 as seen in FIG. 1. The pivot pin 70 is held in place by a nut 100 threaded on the upper end thereof above the limit plate 96.

As best seen in FIG. 5, the limit plate 96 includes a cutout 102 in a portion thereof substantially opposite the orienting hole 98.

The cutout 102 defines limit shoulders 104 and 106 which serve to limit the opening movement of the collar 54 to an extent such that the upper lips 72 of first and second arcuate collar portions 56 and 58 can never be completely removed from the groove 50 of adjusting nut 46.

This limiting of the opening movement of the collar 54 is achieved by the fact that the pin sleeve 90 attached to the second end 80 of arcuate collar portion 58 abuts the second stop shoulder 106, and a similar pin sleeve 108 attached to the second end 78 of first arcuate collar portion 56 abuts the first stop shoulder 104.

Preferably, the quick release pin 94 is attached to a keeper chain 110 which has its other end 112 clipped to a hole 114 disposed in the limit plate 96.

As is best seen in FIG. 6, when the collar 54 is open to the maximum extent allowed by limit plate 96, the upper lips 72 of the first and second arcuate collar portions 56 and 58 still engage a lower surface 116 defining groove 50. This prevents the collar 54 from being removed from the adjusting nut 46 without total disassembly of the collar 54 by removal of the pivot pin 70.

Arcuate collar portions 56 and 58 have the corners of lower lips 74 trimmed adjacent collar ends 60, 66, 78, and 80 as indicated at 117. This provides clearance for casing collar 38 when collar 54 is in its open position.

The main seal 42 is carried by a hydraulically biased seal carrier means 118.

The seal carrier means 118 includes an annular carrier ring 120 slidably disposed in the bore 32 of body 30.

An annular outer carrier seal 122 is disposed between the carrier ring 120 and the bore 32 of body 30.

The main seal 42 includes an L-shaped cross-section annular resilient ring 124 having a first leg 126 engaging bore 32 of body 30 and having a second leg 128 engaging the upper end 44 of casing collar 38. L-shaped resilient ring 124 is disposed in a lower radially outer end groove 130 of carrier ring 120.

Main seal 42 further includes an anti-extrusion ring 132 engaging both the first and second legs 126 and 128 for preventing extrusion of the resilient ring 124 through an annular clearance between the outer surface 40 of casing collar 38 and the bore 32 of body 30.

The carrier ring 120 includes an inner cylindrical extension 134 extending downward longitudinally beyond main seal means 42 toward the casing 36. Extension 134 includes a tapered radially outer end surface 136 for centering seal carrier ring 120 relative to the upper end 44 of casing collar 38.

An effective sealing diameter of second leg 128 against upper end 44 of casing collar 38 will be somewhere in the midportion of the annular area of engagement. That effective sealing diameter is less than the inner diameter of bore 32, so that hydraulic pressure within the body 30 will act across an annular differential area on carrier member 120 thus pushing the carrier member 120 downward and providing a hydraulic bias biasing the main seal 42 against the upper end 44 of casing collar 38.

It is also noted, that if a vacuum is present within the casing 36 a downward bias is still provided due to atmospheric pressure acting across the entire area within a circle within the effective sealing diameter of main seal 42. This is because atmospheric pressure will be pushing down upon the entire plug container 10, while there will be no pressure pushing up on the plug container 10 within the area within the effective sealing diameter of main seal 42.

Two plug container housings 12 may be stacked by removing cap 14 from the plug container and threadedly connecting lower threads, such as 26, of a second housing to the upper threads of first housing 12 where cap 14 is shown in FIG. A.

Also, the plug container 10 may be converted to a circulating swage by removing housing 12 and placing cap 14 directly on body 30 at threads 28. A circulating line is then connected in place of the threaded center plug of cap 14.

Figures 7A, 8:
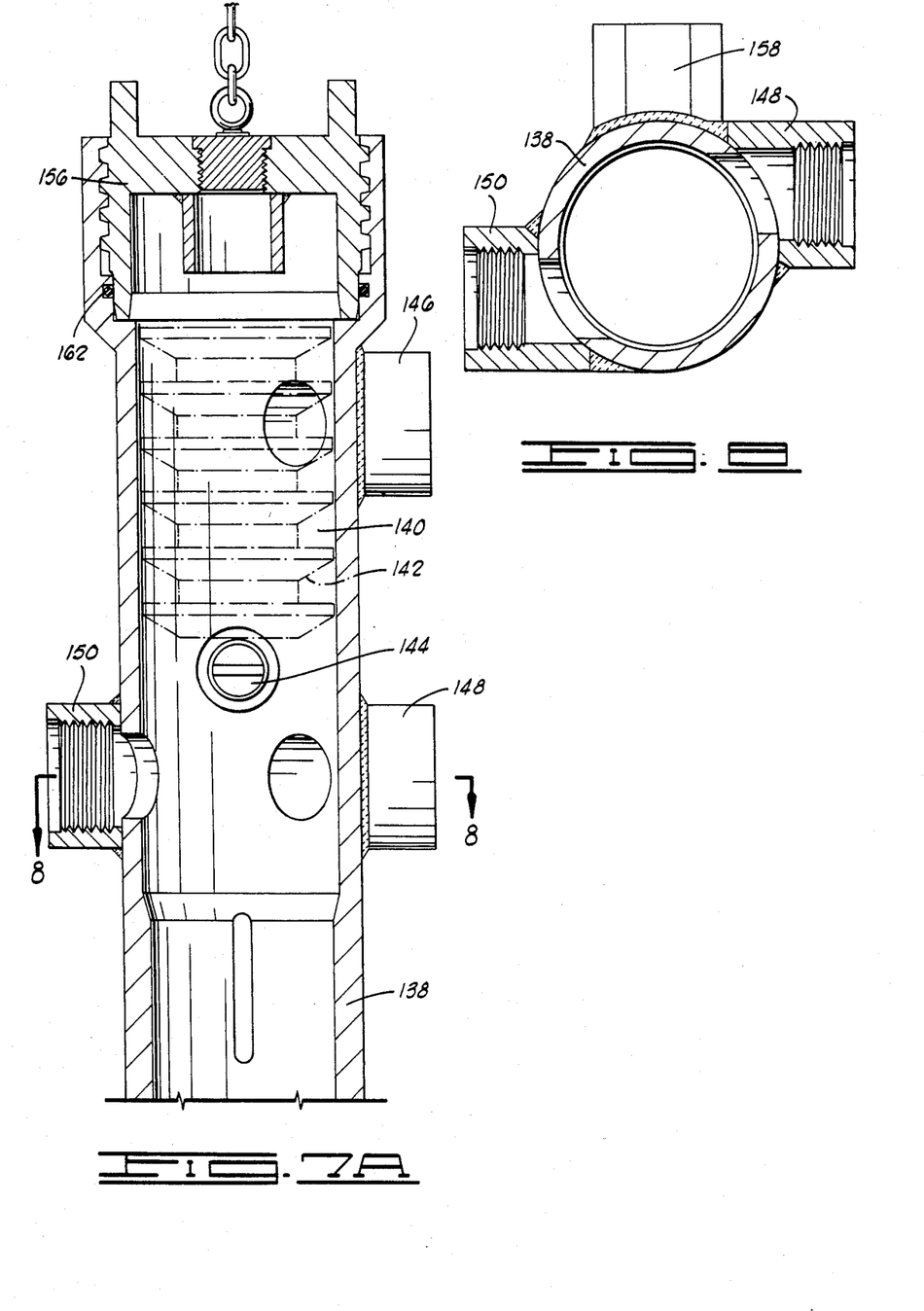
FIGS. 7A-7B comprise a sectioned elevation view of an alternative embodiment of a plug container of the present invention wherein the housing of the plug container is integral with the body member of the coupling apparatus which is threadably engaged with the adjusting nut of the coupling apparatus.
FIG. 8 is a sectional plan view along line 8—8 of FIG. 7 showing the orientation of the lower inlet nozzles of the plug container of FIG. 7.
Figure 7B:
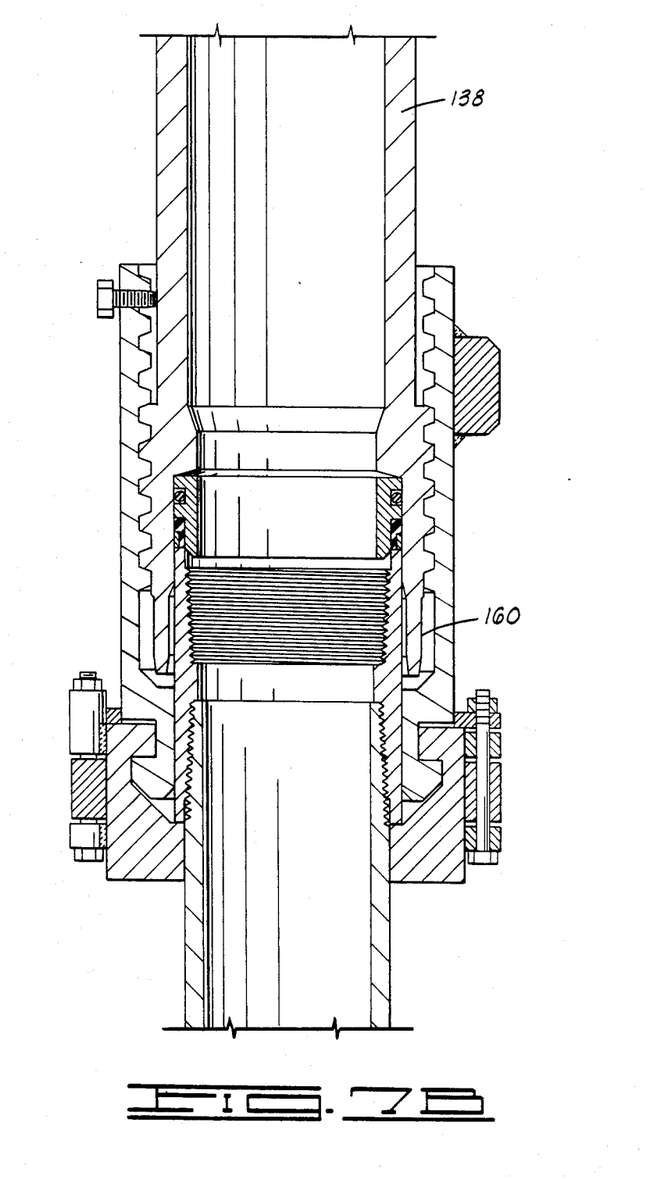
Figure 8:
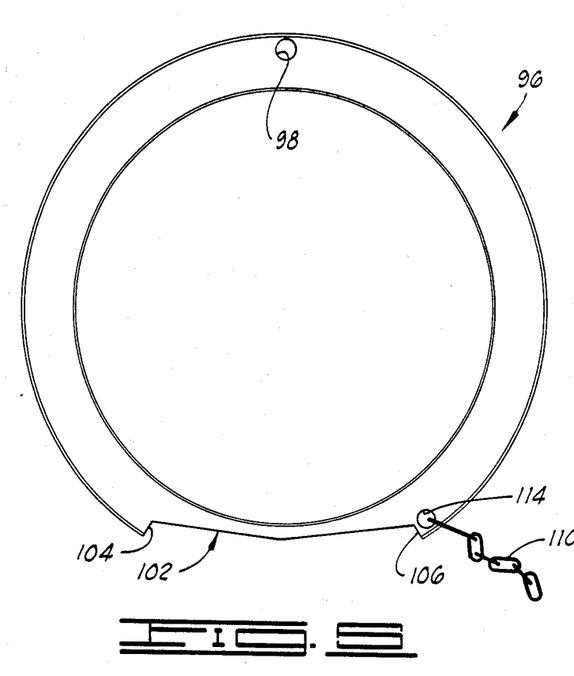
Figure 9:
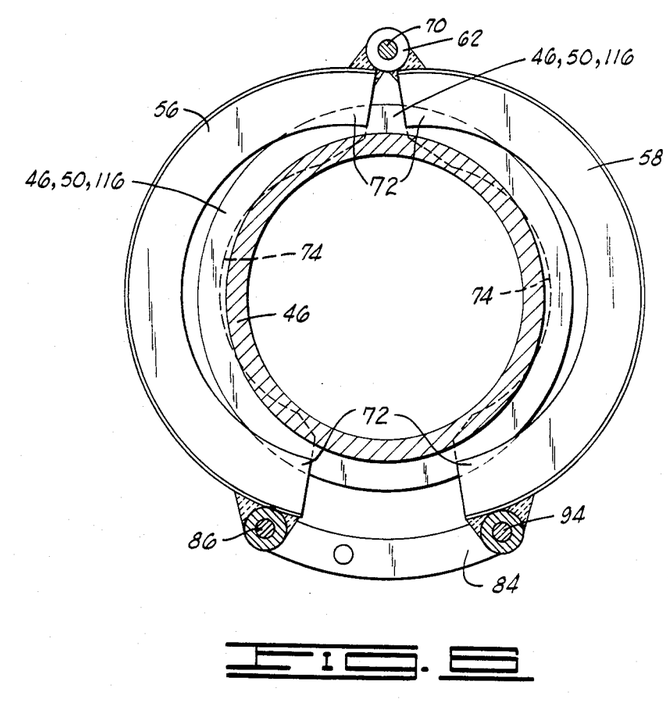

Referring now to FIGS. 7A-7B, a slightly modified version of the present invention is there illustrated. In the embodiment of FIGS. 7A-7B, the difference of interest is in the fact that the body 30 and the housing 12 of FIG. 1 have been constructed as an integral housing-body member 138. A cap 156 is attached to an internally threaded upper end of housing body 138 and a seal therebetween is provided at 162.

Two housing-body members 138 may be stacked by removing plug 156 and attaching a second housing body to the upper end of first housing-body 138 in place of plug 156.

Another feature of the present invention which is best illustrated in FIGS. 7A and 8 is the construction and orientation of the fluid inlet nozzles relative to the housing-body 138. It is noted that the fluid inlet nozzles of the embodiment of FIG. 1 are similarly constructed.

In FIG. 7A, the housing-body 138 includes a plug receiving chamber 140 disposed therein. A cylindrically shaped plug 142, shown in phantom lines, is disposed in the chamber 140 and releasably held in a pre-launch position as illustrated by a releasable plunger 144 in a manner which will be familiar to those skilled in the art. An upper fluid inlet nozzle 146 is disposed substantially tangentially through a wall of the housing-body 138 and directed against a side of the plug 142 when the plug 142 is in its pre-launch position as illustrated. Since nozzle 146 is oriented tangentially, it does not push plug 142 sideways against housing-body 138 as a radial nozzle would. This minimizes friction between plug 142 and housing-body 138 and aids easy release of plug 142.

First and second lower fluid inlet nozzles 148 and 150 are located below the bottom of plug 142 when plug 142 is in its prelaunch position, and are disposed substantially tangentially through the wall of the housing-body 138. The lower nozzles 148 and 150 are located 180° from each other about a circumference of the housing-body 138. In FIG. 8, an indicator coupling 158 is also visible.

All of the nozzles 146, 148 and 150 are oriented at angles of 90° to a longitudinal axis of the housing, thus when the housing is oriented vertically as shown in FIGS. 7A-7B the nozzles are all oriented in a horizontal plane.

Also, all of the nozzles 146, 148 and 150 are oriented so as to direct fluid in a counterclockwise rotational direction as viewed from above within the housing-body 138.

In most prior art plug containers utilizing an upper inlet connection such as 146, the upper inlet nozzle is located above the plug when the plug is in its pre-launch position, and the upper inlet nozzle is typically oriented radially relative to the housing.

By orienting the upper inlet nozzle 146 tangentially, and directing it against the side of the plug 142, a twisting force is imposed on the plug 142 which is believed to help initiate movement of the plug 142 within the housing-body 138 so that it may be reliably displaced therefrom when the plunger 144 is released.

The tangential orientation of the lower fluid inlet nozzles 148 and 150 below the plug 142 creates a swirling vortex type flow which is believed to further aid in the displacement of the plug 142 by imposing a rotational force thereon and also creating a downward sucking force due to the vortex action.

When fluid supply conduits are connected to upper nozzle 146 and one or both of the lower nozzles 148 and 150, the plug container is said to be in a "manifold" mode of use. It may also be used as a "free fall" plug container by blocking off upper inlet nozzle 146.

The manner of use of the present invention is generally as follows.

Referring to FIGS. 1A-1B as an example, the housing 12 is assembled to the body 30. The adjusting nut 46 is made up on the body 30. The first and second arcuate collar portions 56 and 58 are placed about the adjusting nut 46 with the upper lips 70 in the groove 50 and the locking collar 54 is then assembled by placing the pivot pin 70 in place through the first and second arcuate collar portions 56 and 58 and the limit plate 96. The locking collar 54 is then latched in its open position as shown in FIG. 4A. Suitable cementing plugs such as 142 are placed in the housing 12 and the cap 14 is placed on the housing 12.

The plug container 10 is then lowered over the casing collar 38 so that the casing collar 38 is received within the bore 32 of body 30 and engages the main seal 42.

The latch pin 94 is then removed and the locking collar 54 is moved to its closed position and latched in place therein with the latch pin 94 so that the lower lips 74 extend below and engage the lower end 76 of casing collar 38.

The initial compression of main seal 42 may then be adjusted by increasing the threaded connection between threads 48 and 34 of adjusting nut 46 and body 30.

Additional sealing is provided once hydraulic pressure is present within the casing 36 due to the hydraulic biasing of seal carrier means 118.

Thus it is seen that the apparatus of the present invention readily achieves the ends and advantages mentioned as well as those inherent therein. While certain preferred embodiments of the present invention have been illustrated for the purposes of this disclosure, numerous changes in the arrangement and construction of parts may be made by those skilled in the art, which changes are encompassed within the scope and spirit of this invention as defined by the appended claims.

What is claimed is:

1. A coupling apparatus for connection to a cylindrical member, comprising:
    a body having a cylindrical bore disposed in a lower end thereof and having a radially outer threaded surface, said bore having an inner diameter appropriate to closely receive an end of said cylindrical member therein;
    main seal means disposed in said bore of said body for sealing against an annular upward facing surface of said end of said cylindrical member;
    a cylindrical adjusting nut having an internally threaded upper end threadedly engaged with said outer threaded surface of said body, and having an annular groove disposed in a radially outer surface thereof; and
    a locking collar, including
        a first arcuate collar portion having an upper lip received in said annular groove, and having a lower lip adapted to engage a downward facing annular surface of an enlarged diameter portion of said cylindrical member;
        an second arcuate collar portion having an upper lip received in said annular groove, and having a lower lip adapted to engage said downward facing annular surface of said enlarged diameter portion of said cylindrical member;
        a hinge pin, disposed through pin receiving holes in said first and second collar portions, so that said first and second collar portions are pivotally connected;
        a limit plate concentrically disposed about said adjusting nut and having an orientation hole therethrough through which said hinge pin is disposed, said limit plate including means for limiting relative pivotal opening movement of said first and second collar portions; and
        latch means for selectably latching said first and second collar portions in an open position wherein said enlarged diameter portion of said cylindrical member can be passed through said locking collar into said bore of said body, and a closed position wherein said enlarged diameter portion of said cylindrical member is locked within said bore of said body.

2. The apparatus of claim 1, further comprising:
    hydraulically biased seal carrier means, having said main seal means connected thereto, for biasing said main seal means against said annular upward facing surface of said end of said cylindrical member in response to hydraulic pressure within said bore of said body.

3. The apparatus of claim 2, wherein:
    said seal carrier means includes:
        an annular carrier ring slidably disposed in said bore of said body; and
        an annular outer carrier seal disposed between said carrier ring and said bore of said body; and
    said main seal means is disposed in a lower radially outer end groove of said carrier ring, and arranged to engage said annular upward facing surface of said end of said cylindrical member on an effective sealing diameter less than an inner diameter of said bore of said body, so that hydraulic pressure within said bore of said body biases said carrier means downward toward said cylindrical member.

* * * * *